(12) United States Patent
Hirose et al.

(10) Patent No.: US 10,704,950 B2
(45) Date of Patent: Jul. 7, 2020

(54) LIQUID LEVEL DETECTING DEVICE

(71) Applicant: Yazaki Corporation, Minato-ku, Tokyo (JP)

(72) Inventors: Ryo Hirose, Makinohara (JP); Shintaro Nakajima, Makinohara (JP); Shinpei Kato, Makinohara (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 165 days.

(21) Appl. No.: 15/997,008

(22) Filed: Jun. 4, 2018

(65) Prior Publication Data
US 2018/0348046 A1   Dec. 6, 2018

(30) Foreign Application Priority Data

Jun. 5, 2017   (JP) .................................. 2017-111089
Mar. 13, 2018   (JP) .................................. 2018-045754

(51) Int. Cl.
*G01F 23/38* (2006.01)
*G01F 23/60* (2006.01)

(52) U.S. Cl.
CPC ............ *G01F 23/603* (2013.01); *G01F 23/38* (2013.01)

(58) Field of Classification Search
CPC ....... G01F 23/603; G01F 23/38; G01D 5/145; G01D 11/245; F17C 2250/0413

USPC .......................................................... 73/313
See application file for complete search history.

(56) References Cited

U.S. PATENT DOCUMENTS

2004/0003660 A1* 1/2004 Fukuhara ................ G01F 23/38
73/319
2015/0362356 A1* 12/2015 Fukuhara ................ G01F 23/38
73/314

FOREIGN PATENT DOCUMENTS

JP           5382855 B2      1/2014

\* cited by examiner

*Primary Examiner* — Suman K Nath
(74) *Attorney, Agent, or Firm* — Sughrue Mion, PLLC

(57) ABSTRACT

A liquid level detecting device includes a sensor housing having a circular rotation recess, a circular holder which is fitted in the rotation recess and held rotatably by the sensor housing, a float arm, a float, a magnet, and a Hall element. The sensor housing has a lock groove and a pair of insertion holes. The holder has a pair of flanges which project in opposite directions from an outer circumferential surface of the holder and are engaged with the lock groove and prevented from coming off the rotation recess by setting the flanges opposed to the respective insertion holes, fitting the flanges into the rotation recess, and then rotating the flanges. The holder has a pair of support projections which come into contact with a bottom surface of the rotation recess.

4 Claims, 13 Drawing Sheets

LIQUID LEVEL DETECTING DEVICE

CROSS REFERENCE TO RELATED APPLICATIONS

This application is based on Japanese Patent Application (No. 2017-111089) filed on Jun. 5, 2017 and Japanese Patent Application (No. 2018-045754) filed on Mar. 13, 2018, the contents of which are incorporated herein by reference.

BACKGROUND OF THE INVENTION

1. Field of the Invention

The present invention relates to a liquid level detecting device.

2. Description of the Related Art

Liquid level detecting devices for detecting a level of a liquid stored in a tank are equipped with a device main body having a Hall element, a holder in which a magnet is provided so as to be rotatable with respect to the device main body, a float arm whose base portion is attached to the holder, and a float that is attached to a tip portion of the float arm (refer to JP-B-5382855 for example).

A sensor housing that is a component of the device main body is formed with a recess in which the holder is held rotatably. The holder is formed with, on its outer circumference, three projection pieces at the same intervals in the circumferential direction. The sensor housing is formed with a circumferential groove outside the recess, and three cuts are formed on the edge of the recess at the same intervals in the circumferential direction. After the holder is set so that the projection pieces are opposed to the respective cuts, the projection pieces are fitted into the recess and the holder is rotated, whereby the projection pieces are engaged with the recess and thereby prevented from coming off the recess. As a result, in this liquid level detecting device, the holder can be rotated in such a rotation angle range that the projection pieces of holder do not reach the respective cuts and come off the recess.

Incidentally, to increase the ease of installation in an installation location such as a tank and the degree of freedom of designing of the float arm, it is preferable to make the rotation angle range of the holder as wide as possible by decreasing the number of holder projection pieces (flanges) to engage with the groove of the sensor housing. However, if the number of holder projection pieces is decreased, the holding of the holder by the recess of the sensor housing may become unstable to cause much play and a resulting holder rotation failure may lower the accuracy of detection of a liquid surface level.

SUMMARY OF THE INVENTION

The present invention has been made in view of the above circumstances, and an object of the invention is therefore to provide a liquid level detecting device capable of increasing the rotation angle range of the holder while securing high detection accuracy.

To attain the above object, the invention provides liquid level detecting devices of the following items (1) to (3):

(1) A liquid level detecting device including:
a sensor housing having a circular rotation recess;
a circular holder which is fitted in the rotation recess and is held rotatably by the sensor housing;
a float arm which is fixed to the holder;
a float which is attached to a tip portion of the float arm and varies in position following a liquid surface of liquid stored in a tank;
a magnet having a circular-ring shape and which is provided in the holder; and
a Hall element which is provided in the sensor housing and detects a displacement of the magnet,
wherein the sensor housing has a lock groove which is formed over an inner full circumference portion of the rotation recess in a circumference direction of the circular rotation recess and a pair of insertion holes which are formed at opposite positions on a circumferential edge of the rotation recess so as to communicate with the lock groove;
wherein the holder has a pair of flanges which project in opposite directions from an outer circumferential surface of the holder and are engaged with the lock groove and prevented from coming off the rotation recess by setting the flanges opposed to the respective insertion holes, fitting the flanges into the rotation recess, and then rotating the flanges; and
wherein the holder has a pair of support projections which come into contact with a bottom surface of the rotation recess and the pair of support projections are arranged at middle positions between the flanges respectively in a circumferential direction of the holder.

(2) The liquid level detecting device according to item (1), wherein the sensor housing has a shaft portion which projects from the bottom surface of the rotation recess, the shaft portion incorporating the Hall element; and
wherein an axial recess configured to receive the shaft portion is formed at inside the magnet in the holder.

(3) The liquid level detecting device according to item (1) or (2), wherein the support projections extend in the circumferential direction of the holder, and each of the support projections has a play-preventive flange that projects in a radial direction of the holder from an outer circumferential surface of a tip portion of the support projection.

In the liquid level detecting device having the configuration of item (1), since the holder has the pair of flanges which project in opposite directions and serve to prevent the holder from coming off the rotation recess of the sensor housing, the rotation angle range of the holder can be increased and the degree of freedom of designing can be made higher. As a result, the liquid level detecting device can be enhanced in the ease of installation in a tank or the like.

Furthermore, the holder is formed with, at the middle positions between the flanges in the circumferential direction, the pair of support projections to come into contact with the bottom surface of the rotation recess. Thus, the posture of the holder can be stabilized by the flanges and the support projections and the accuracy of detection of a liquid level can be increased, though the number of flanges is reduced to increase the rotation angle range of the holder.

In the liquid level detecting device having the configuration of item (2), since the posture of the holder relative to the sensor housing is stabilized by the flanges and the support projections, a problem can be suppressed that a large inclination of the holder causes the outer circumferential surface of the shaft portion of the sensor housing to strongly come into contact with the inner circumferential surface of the axial recess of the holder and thereby lowers the accuracy of detection of a liquid surface level due to a rotation failure of the holder.

In the liquid level detecting device having the configuration of item (3), since the support projections extend longer than the flanges in the circumferential direction of the holder and each of the support projections has a play-preventive flange that projects in a radial direction from an outer circumferential surface of a tip portion of the support projection, the area of contact, to the bottom surface of the rotation recess of the sensor housing, of each support projection can be made larger than that of each rib-shaped support projection. And the area of contact, to the bottom surface of the rotation recess, of each support projection can be made approximately equal to that of each flange. As a result, the support projections are made equivalent in sliding wear resistance to the flanges and hence the liquid level detecting device is made more reliable in terms of product durability.

The invention makes it possible to provide a liquid level detecting device capable of increasing the rotation angle range of the holder while securing high detection accuracy.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIG. 9A is a vertical sectional view and FIG. 9B is a horizontal sectional view.

FIG. 15A is a vertical sectional view and FIG. 15B is a horizontal sectional view.

DETAILED DESCRIPTION OF THE EXEMPLARY EMBODIMENTS

Figure 1:
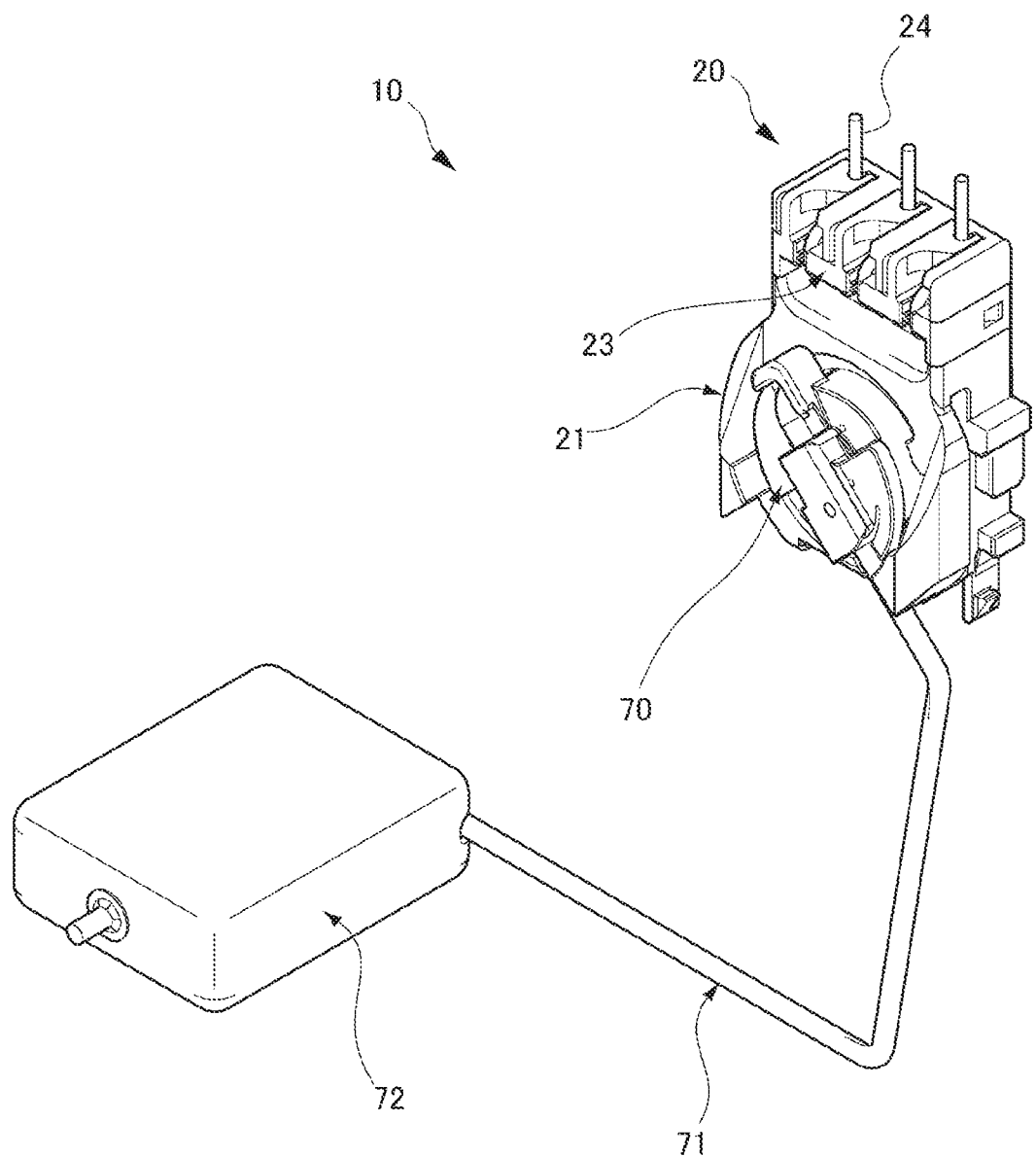
FIG. 1 is a perspective view of the whole of a liquid level detecting device according to an embodiment of the present invention.
Figure 2:
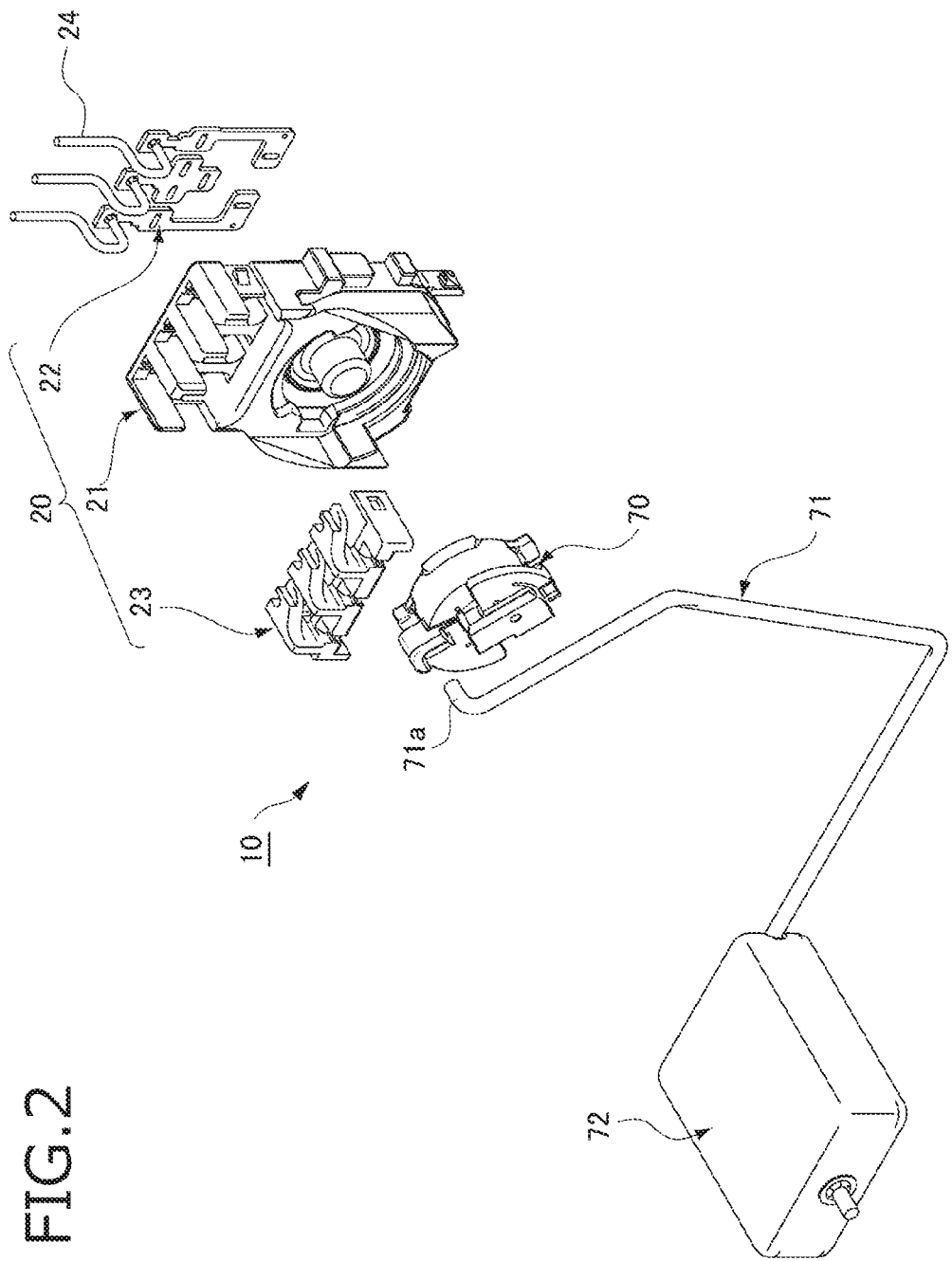
FIG. 2 is an exploded perspective view of the liquid level detecting device according to the embodiment.
Figure 3:
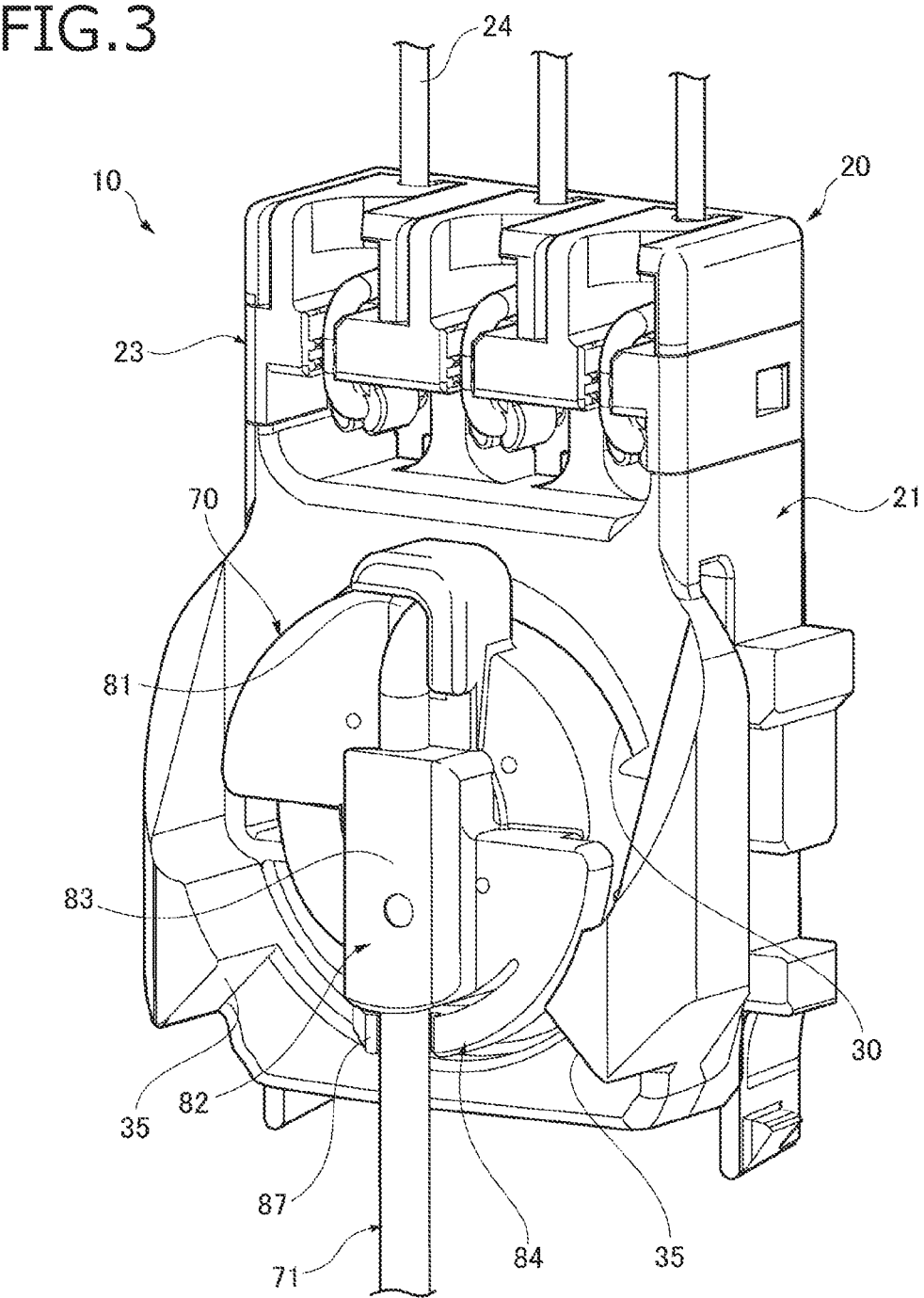
FIG. 3 is a perspective view of an essential part of the liquid level detecting device according to the embodiment.
Figure 4:
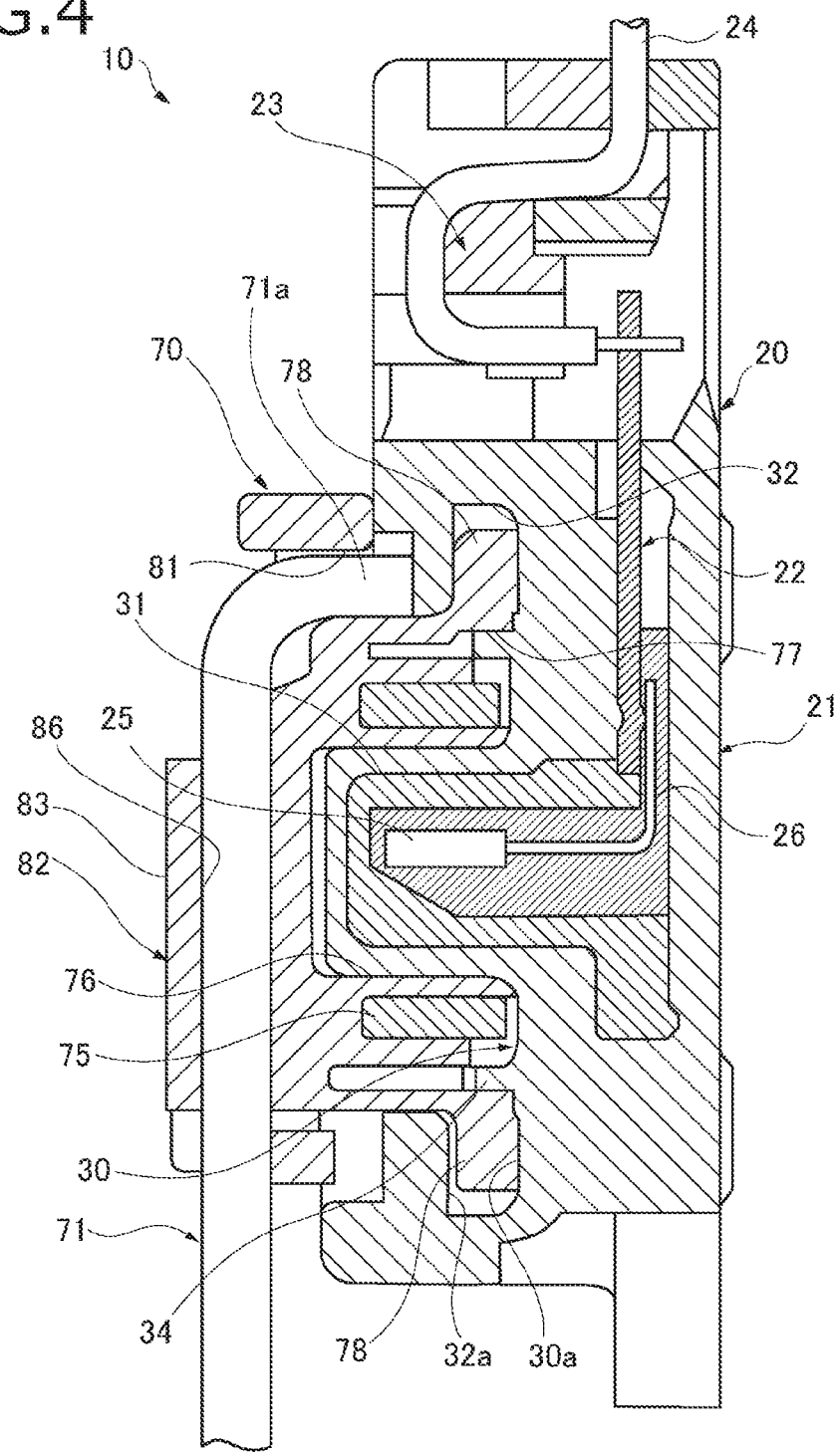
FIG. 4 is a sectional view of the liquid level detecting device according to the embodiment.

An embodiment of the present invention will be hereinafter described with reference to the drawings. FIG. 1 is a perspective view of the whole of a liquid level detecting device 10 according to the embodiment. FIG. 2 is an exploded perspective view of the liquid level detecting device 10. FIG. 3 is a perspective view of an essential part of the liquid level detecting device 10. FIG. 4 is a sectional view of the liquid level detecting device 10.

As shown in FIGS. 1 and 2, the liquid level detecting device 10 according to the embodiment includes a device main body 20, a holder 70, a float arm 71, and a float 72. The device main body 20 includes a sensor housing 21, a terminal 22, and a holding member 23.

As shown in FIGS. 3 and 4, the terminal 22 and the holding member 23 are attached to the sensor housing 21. A lead 26 of a Hall element 25 which is provided inside the sensor housing 21 is electrically connected to the terminal 22. Detection wires 24 which are held by the holding member 23 are connected to the terminal 22 and lead out from the top of the sensor housing 21.

A base portion of the float arm 71 is connected to the holder 70. The float 72 is fixed to the other end portion, which is a free end portion, of the float arm 71. The holder 70 which is circular and has a circular-ring-shaped magnet 75 inside is attached to a front portion of the sensor housing 21 and held by it rotatably.

The liquid level detecting device 10 is attached to an attachment target portion of, for example, a fuel tank that is installed in a vehicle such as an automobile, and detects a liquid level of a fuel stored inside the fuel tank.

In the liquid level detecting device 10, the float arm 71 swings as the float 72 moves following the liquid surface. And the holder 70 to which the float arm 71 is connected rotates with respect to the device main body 20. In response, the Hall element 25 which is provided in the device main body 20 detects a variation of the magnetic flux generated by the magnet 75 which is provided in the holder 70 and a detection result is sent to a measuring unit through the detection wires 24. The measuring unit determines a liquid level on the basis of the detection result received from the Hall element 25, and issues a warning if necessary. For example, the measuring unit issues a warning of a fuel shortage of the fuel tank.

Figure 5A:
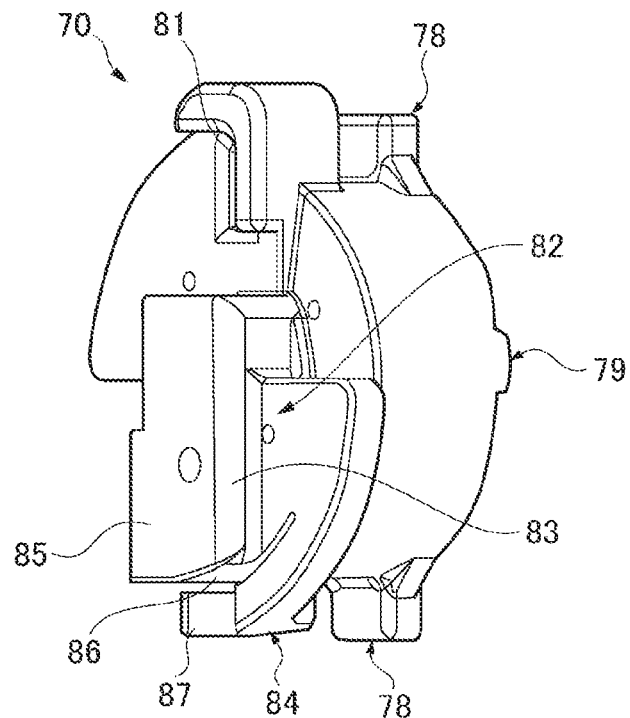
FIGS. 5A and 5B are perspective views, as viewed from the front side and the rear side, respectively, of a holder, and illustrate its structure.
Figure 5B:
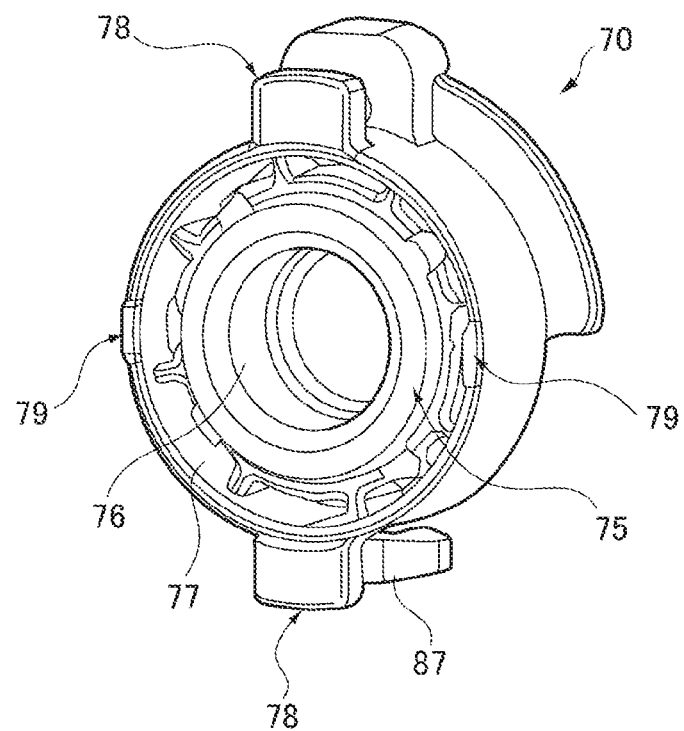

FIGS. 5A and 5B illustrate the structure of the holder 70. FIGS. 5A and 5B are perspective views, as viewed from the front side and the rear side, respectively, of the holder 70.

As shown in FIG. 5A, the holder 70 has an arm fixing portion 82 on the front side. The float arm 71 is fixed to the holder 70 by means of the arm fixing portion 82. The arm fixing portion 82 has a lock hole 81, a holding portion 83, and a lock portion 84. The lock hole 81 is formed in a portion, located on the circumference, of the holder 70. The base portion (one end portion) of the float arm 71 has a lock end portion 71a which is bent at a right angle and inserted in the lock hole 81 (see FIG. 4).

The holding portion 83 has a holding piece 85 which projects sideways, and a holding groove 86 is formed between the holding piece 85 and a front surface of the holder 70. A portion, in the vicinity of its base-side end, of the float arm 71 is fitted into the holding groove 86 from the side. The lock portion 84 is formed in the holding portion 83 on the side opposite to the lock hole 81, and has a nail 87 which projects toward the front side of the holder 70. The nail 87 is locked on a circumferential surface of the float arm 71 that is fitted in the holding groove 86 of the holding portion 83.

As shown in FIG. 5B, the holder 70 has an axial recess 76 at its center on the rear side. The circular-ring-shaped magnet 75 is disposed outside the axial recess 76. The holder 70 is formed with a guide recess 77 on the rear side outside the magnet 75. The holder 70 also has a pair of flanges 78 at top and bottom positions on its circumference on the rear side. The flanges 78 project outward in opposite radial directions, and project slightly toward the rear side of the holder 70. Furthermore, the holder 70 has, at left and right positions on its rear circumferential edge, a pair of ribs 79 which are support projections to come into contact with a bottom surface 30a of a rotation recess 30 (described later). The ribs 79 project rearward slightly, and each rib 79 is located at the middle between the flanges 78 in the circumferential direction.

Figure 6:
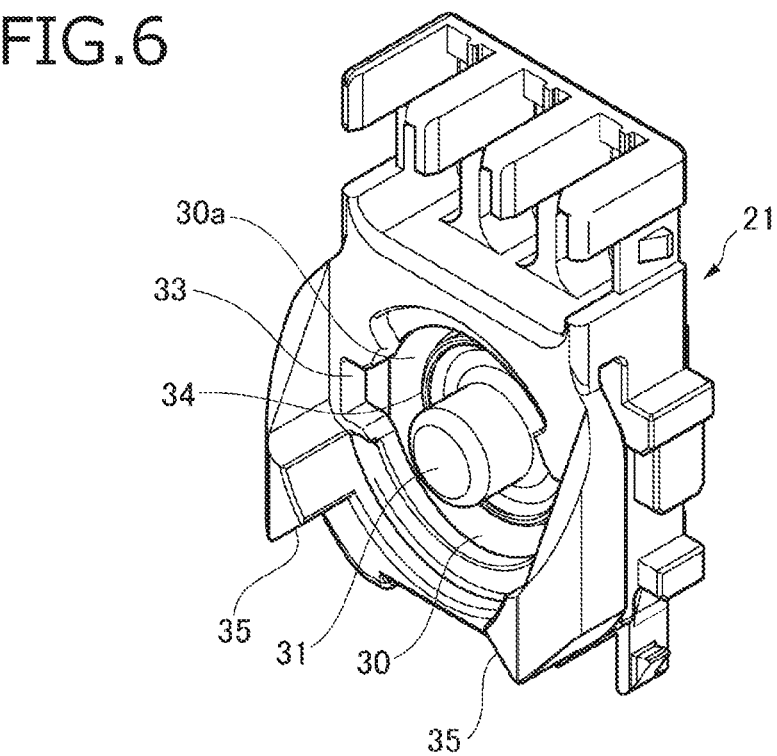
FIG. 6 is a perspective view of a sensor housing.
Figure 7:
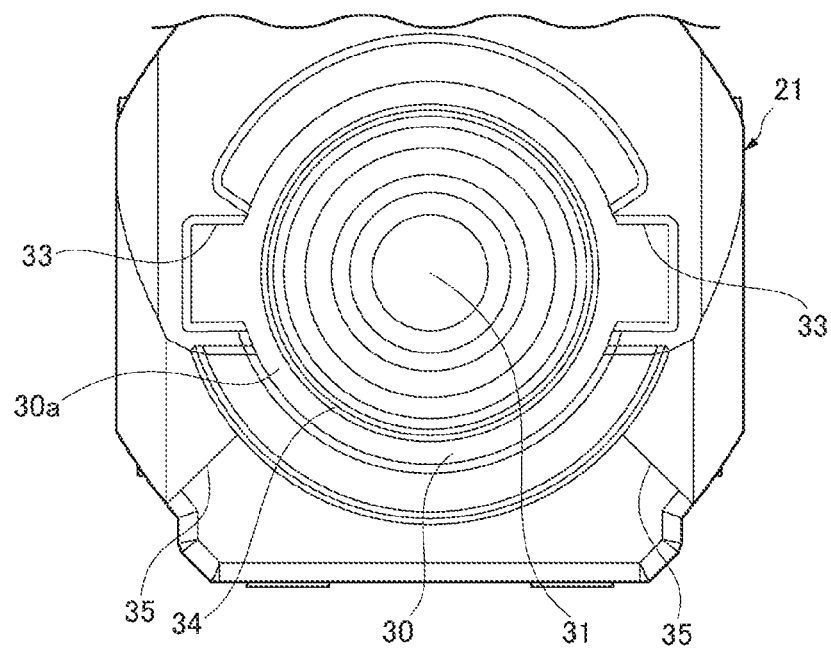
FIG. 7 is a front view of part of the sensor housing.
Figure 8:
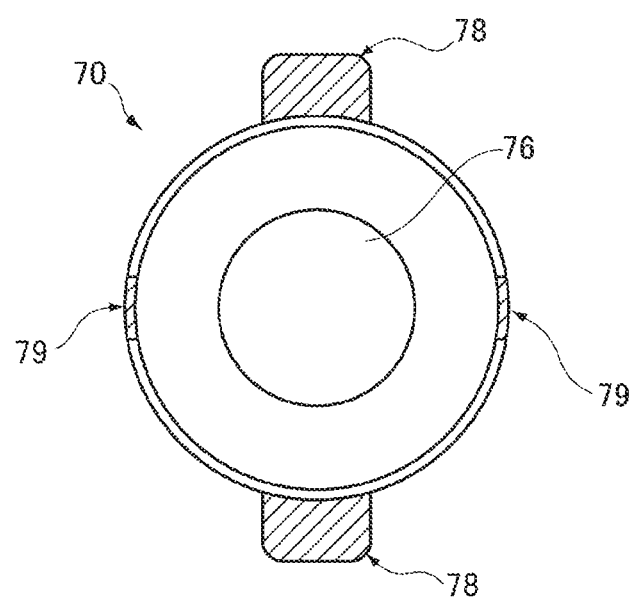
FIG. 8 is a rear view of the holder and shows its flanges and ribs.

FIG. 6 is a perspective view of the sensor housing 21. FIG. 7 is a front view of part of the sensor housing 21. FIG. 8 is a rear view of the holder 70 and shows the flanges 78 and the ribs 79 of the holder 70.

As shown in FIGS. 6 and 7, the sensor housing 21 of the device main body 20 has, on the front side, the circular rotation recess 30 in which the holder 70 is set rotatably. A shaft portion 31 which is provided with the Hall element 25 projects at the center in the rotation recess 30. In the sensor housing 21, a lock groove 32 is formed over the full circumference adjacent to an outside portion of the rotation recess 30. The sensor housing 21 is formed with a pair of insertion holes 33 on the front side at opposite positions (i.e., left and right positions) on the circumferential edge of the rotation recess 30. The insertion holes 33 communicate with the lock groove 32. A guide projection step 34 is formed over the full circumference at the bottom of the rotation recess 30 so as to surround the shaft portion 31.

A pair of stoppers 35 project at front positions of the sensor housing 21 below the center of the rotation recess 30. The stoppers 35 are located outside the rotation recess 30 so as to be spaced from each other in the left-right direction.

To attach the holder 70 to the sensor housing 21, the flanges 78 of the holder 70 are set opposed to the respective insertion holes 33 of the sensor housing 21 and then the holder 70 is fitted into the rotation recess 30. As a result, the flanges 78 are inserted through the respective insertion holes 33 and the shaft portion 31 of the sensor housing 21 is inserted into the axial recess 76 of the holder 70. And the guide projection strip 34 of the sensor housing 21 goes into the guide recess 77 of the holder 70.

Subsequently, the holder 70 that is fitted in the rotation recess 30 is rotated so that the lock hole 81 will be located at the top. As a result, the flanges 78 of the holder 70 go into the lock groove 32 of the sensor housing 21, whereby the holder 70 is prevented from coming off the rotation recess 30 of the sensor housing 21.

When the float arm 71 is attached to the arm fixing portion 82 of the holder 70 being held in the rotation recess 30, the swing angle range of the float arm 71 is restricted because the float arm 71 hits one of the stoppers 35 in making a swing. This prevents the holder 70 from coming off the sensor housing 21 due to movement of the flanges 78 of the holder 70 to the positions of the insertion holes 33.

When as described above the holder 70 is held rotatably being fitted in the rotation recess 30 of the sensor housing 21, as shown in FIG. 8 the rear surfaces of the flanges 78 and the edges of the ribs 79 serve as contact portions (hatched in FIG. 8) to come into contact with the bottom surface 30a (see FIG. 7) of the rotation recess 30; the posture of the holder 70 is held because these contact portions come into contact with the bottom surface 30a. As such, the flanges 78 and the ribs 79 have a function of maintaining the posture of the holder 70 by sliding on the bottom surface 30a of the rotation recess 30 when the holder 70 rotates. With this structure, the frictional resistance is made smaller to allow the holder 70 to rotate more smoothly than in a structure in which the entire rear surface of a holder comes into contact with the bottom surface 30a of the rotation recess 30. The flanges 78 perform the function of maintaining the posture of the holder 70 also by coming into contact with an inner surface 32a, opposed to the bottom surface 30a of the rotation recess 30, of the lock groove 32.

Figure 9A:
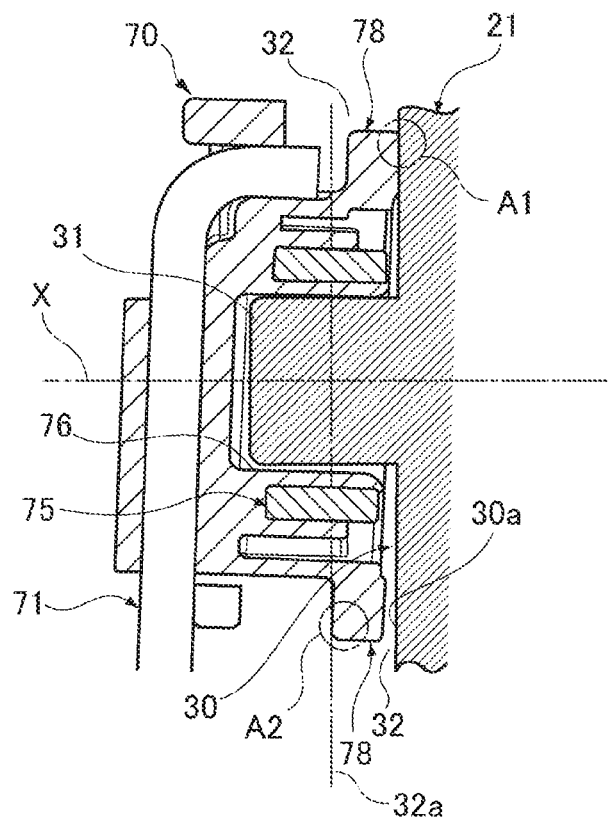
FIGS. 9A and 9B illustrate how the flanges and the ribs control the posture of the holder.
Figure 9B:
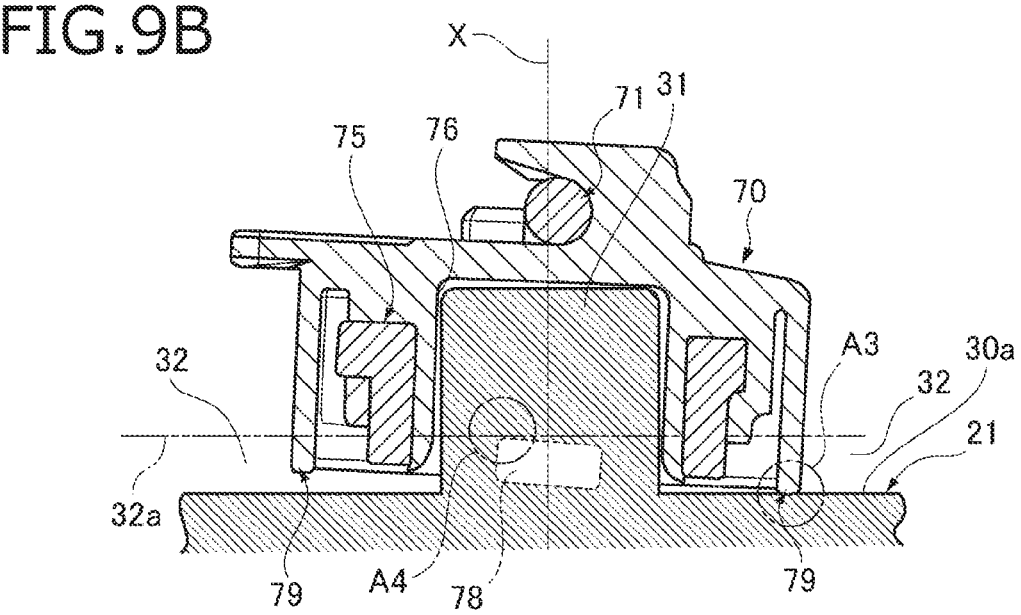
Figure 10:
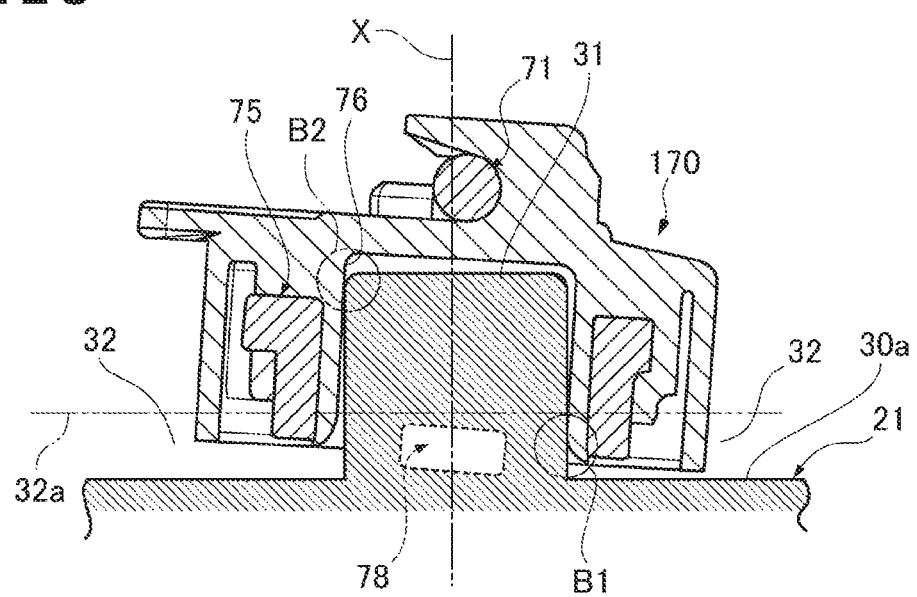
FIG. 10 is a horizontal sectional view illustrating how a holder is inclined in a comparative example without the ribs.

Next, the function of maintaining the posture of the holder 70 which is performed by the flanges 78 and the ribs 79 will be described. FIGS. 9A and 9B illustrate how the flanges 78 and the ribs 79 control the posture of the holder 70. FIG. 9A is a vertical sectional view and FIG. 9B is a horizontal sectional view. FIG. 10 is a horizontal sectional view illustrating how a holder 170 is inclined in a comparative example without the ribs 79.

As shown in FIG. 9A, if a force that crosses the rotation axis X of the holder 70 in the vertical plane acts on the holder 70 in a state that the flanges 78 are located at the top and bottom positions, one flange 78 comes into contact with the bottom surface 30a of the rotation recess 30 (at a position indicated by symbol A1 in FIG. 9A) and the other flange 78 comes into contact with the inner surface 32a of the lock groove 32 (at a position indicated by symbol A2 in FIG. 9A). In this manner, inclination of the holder 70 in the vertical plane is suppressed.

As shown in FIG. 9B, if a force that crosses the rotation axis X of the holder 70 in the horizontal plane acts on the holder 70 in a state that the flanges 78 are located at the top and bottom positions, one rib 79 comes into contact with the bottom surface 30a of the rotation recess 30 (at a position indicated by symbol A3 in FIG. 9B) and the other rib 79 comes into contact with the inner surface 32a of the lock groove 32 (at a position indicated by symbol A4 in FIG. 9B). In this manner, inclination of the holder 70 in the horizontal plane is suppressed.

As described above, in the liquid level detecting device 10 according to the embodiment, since the holder 70 has the pair of flanges 78 for preventing the holder 70 from coming off the rotation recess 30 of the sensor housing 21 at the opposite positions, the rotation angle range of the holder 70 can be increased. More specifically, the rotation angle range can be made larger (about 180°) than in a conventional structure in which the holder is prevented from coming off by arranging three flanges at the same intervals in the circumferential direction (about 120°).

Furthermore, as shown in FIG. 10, in the case of a holder 170 of a comparative example in which no ribs 79 are formed between the pair of flanges 78, if a force that crosses the rotation axis X of the holder 170 in the horizontal plane, absent the function that the ribs 79 suppress inclination of the holder 170, the holder 170 is inclined to a large extent in the horizontal plane. As a result, the outer circumferential surface of the shaft portion 31 of the sensor housing 21 strongly comes into contact with the inner circumferential surface of the axial recess 76 of the holder 170 (at positions indicated by symbols B1 and B2 in FIG. 10), possibly lowering the accuracy of detection of a liquid surface level due to a rotation failure of the holder 170.

In contrast, in the liquid level detecting device 10 according to the embodiment, since the holder 70 has the pair of ribs 79 on its rear circumferential edge at the middle positions between the flanges 78 in the circumferential direction, the posture of the holder 70 can be stabilized by the flanges 78 and the ribs 79.

Thus, a problem can be suppressed that a large inclination of the holder 70 causes the outer circumferential surface of the shaft portion 31 of the sensor housing 21 to strongly come into contact with the inner circumferential surface of the axial recess 76 of the holder 70 and thereby lowers the accuracy of detection of a liquid surface level due to a rotation failure of the holder 70.

The invention is not limited to the above embodiment and various modifications, improvements, etc. can be made as appropriate. The materials, shapes, sets of dimensions, numbers, locations, etc. of the respective constituent elements of the above embodiment are not limited to those disclosed but can be determined in desired manners as long as the invention can be implemented.

For example, the pair of flanges 78 and the pair of ribs 79 may be formed at positions that are deviated from each other in the radial direction. With this measure, the lines along which the pair of flanges 78 and the pair of ribs 79 slide on the bottom surface 30a of the rotation recess 30 are deviated from each other in the radial direction, whereby the degrees of their wear can be made as low as possible.

Figure 11A:
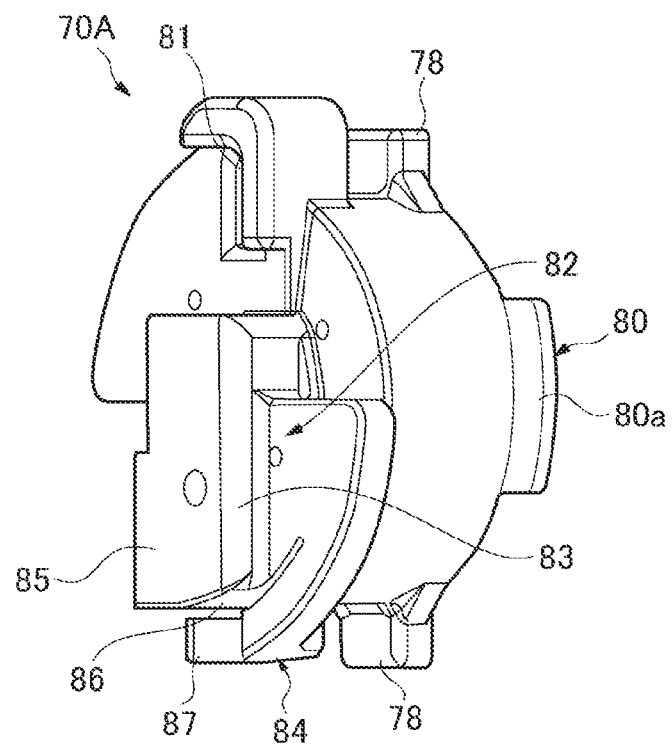
FIGS. 11A and 11B are perspective views, as viewed from the front side and the rear side, respectively, of a holder of a liquid level detecting device according to another embodiment of the invention, and illustrate its structure.
Figure 11B:
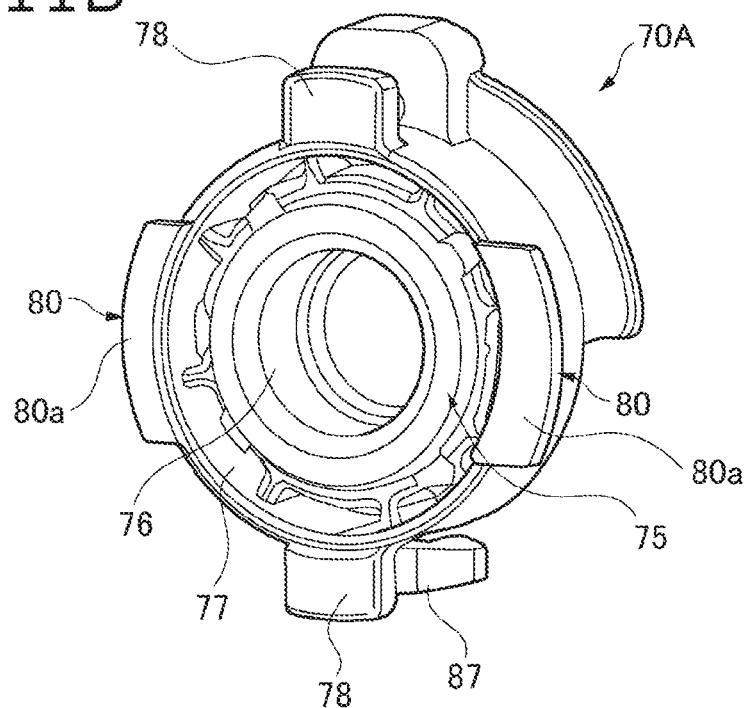

FIGS. 11A and 11B are perspective views, as viewed from the front side and the rear side, respectively, of a holder 70A of a liquid level detecting device according to another embodiment of the invention, and illustrate its structure.

As shown in FIGS. 11A and 11B, the holder 70A of the liquid level detecting device according to the other embodiment is the same in configuration as the above-described holder 70 except for support projections 80 which are to come into contact with the bottom surface 30a of the rotation recess 30. Thus, constituent members of the holder 70A having the same ones in the holder 70 will be given the same reference symbols as the latter and will not be described in detail.

As shown in FIGS. 11A and 11B, the holder 70A has a pair of support projections 80 which are to come into contact with the bottom surface 30a of the rotation recess 30, at left and right positions on its rear circumferential edge at middle positions between the flanges 78 in the circumferential direction. The ribs 79 project rearward slightly, and each rib 79 is located at the middle between the flanges 78 in the circumferential direction. The support projections 80 project rearward slightly from the rear edge of the holder 70A and extend longer than the flanges 78 in the circumferential direction. Each support projection 80 has a play-preventive flange 80a which projects outward in a radial direction from the outer circumferential surface of a tip portion of the support projection 80. As such, each support projection 80 is L-shaped in a cross section (see FIG. 15B).

Figure 12:
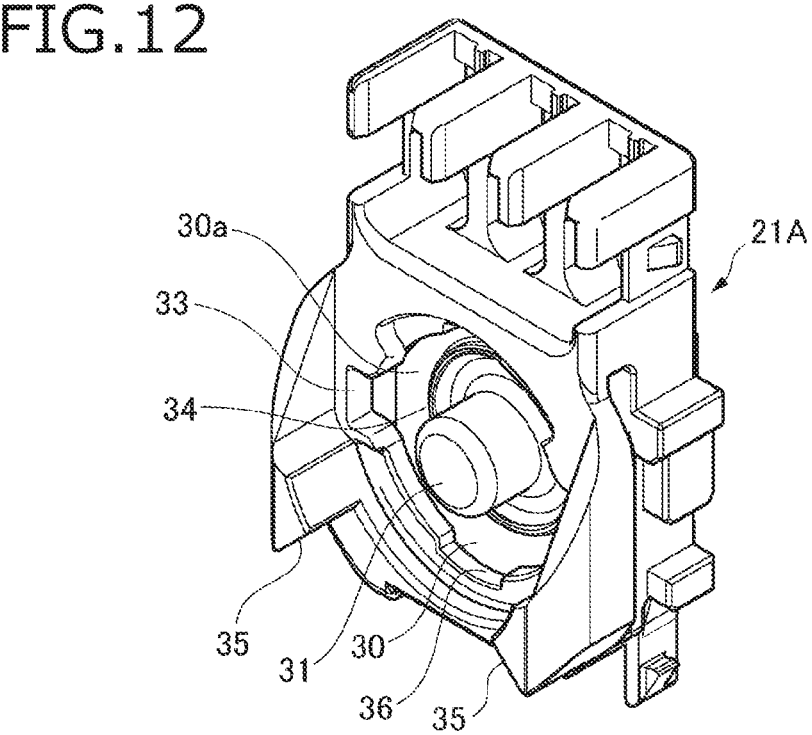
FIG. 12 is a perspective view of a sensor housing of the liquid level detecting device according to the other embodiment.
Figure 13:
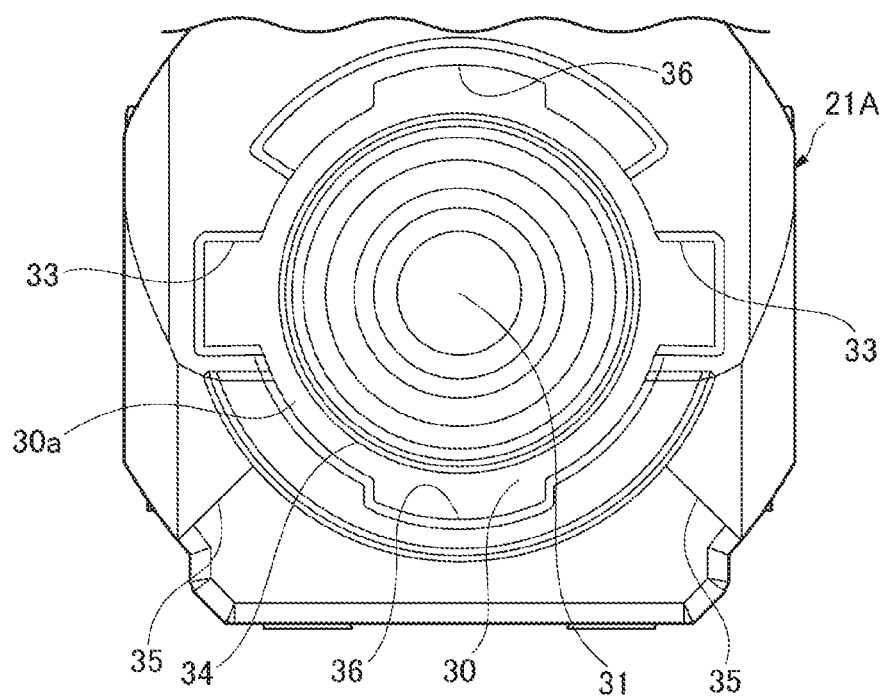
FIG. 13 is a front view of part of the sensor housing shown in FIG. 12.
Figure 14:
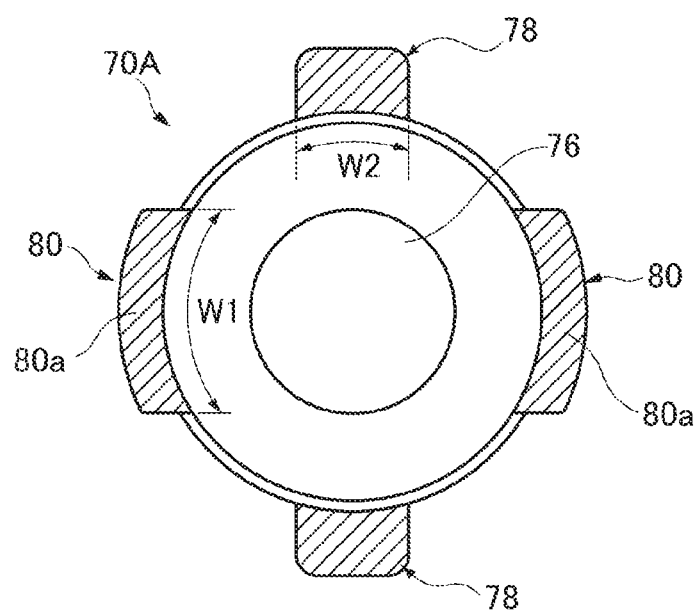
FIG. 14 is a rear view of the holder shown in FIGS. 11A and 11B and shows its flanges and support projections.

FIG. 12 is a perspective view of a sensor housing 21A of the liquid level detecting device according to the other embodiment. FIG. 13 is a front view of part of the sensor housing 21A shown in FIG. 12. FIG. 14 is a rear view of the holder 70A shown in FIGS. 11A and 11B and shows its flanges 78 and support projections 80.

As shown in FIGS. 12 and 13, the sensor housing 21A of the liquid level detecting device according to the other embodiment is the same in configuration as the above-described sensor housing 21 except for cut holes 36 through to insert the respective support projections 80. Thus, constituent members of the sensor housing 21A having the same ones in the sensor housing 21 will be given the same reference symbols as the latter and will not be described in detail.

As shown in FIG. 13, the sensor housing 21A is formed with, on the front side, the pair of cut holes 36 through to insert the play-preventives flanges 80a of the support projections 80, respectively. The cut holes 36 are formed at top and bottom positions outside the rotation recess 30 so as to communicate with the lock groove 32.

To attach the holder 70A to the sensor housing 21A, the flanges 78 and the play-preventive flanges 80a of the holder 70A are set opposed to the insertion holes 33 and the cut holes 36 of the sensor housing 21A, respectively, and then the holder 70A is fitted into the rotation recess 30. As a result, the flanges 78 and the play-preventive flanges 80a are inserted through the insertion holes 33 and the cut holes 36 and the shaft portion 31 of the sensor housing 21 is inserted into the axial recess 76 of the holder 70A.

Subsequently, the holder 70A that is fitted in the rotation recess 30 is rotated so that the lock hole 81 will be located at the top. As a result, the flanges 78 of the holder 70A go into the lock groove 32 of the sensor housing 21A, whereby the holder 70A is prevented from coming off the rotation recess 30 of the sensor housing 21A.

When the float arm 71 is attached to the arm fixing portion 82 of the holder 70 being held in the rotation recess 30, the swing angle range of the float arm 71 is restricted because the float arm 71 hits one of the stoppers 35 in making a swing. This prevents the holder 70 from coming off the sensor housing 21 due to movement of the flanges 78 of the holder 70 to the positions of the insertion holes 33.

In the state that as described above the holder 70A is held rotatably being fitted in the rotation recess 30 of the sensor housing 21A, as shown in FIG. 14 the rear surfaces of the flanges 78 and the rear surfaces of the support projections 80 serve as contact portions (hatched in FIG. 14) to come into contact with the bottom surface 30a (see FIG. 13) of the rotation recess 30; the posture of the holder 70A is held because these contact portions come into contact with the bottom surface 30a. As such, the flanges 78 and the support projections 80 have a function of maintaining the posture of the holder 70A by sliding on the bottom surface 30a of the rotation recess 30 when the holder 70A rotates. With this structure, the frictional resistance is made smaller to allow the holder 70A to rotate more smoothly than in a structure in which the entire rear surface of a holder comes into contact with the bottom surface 30a of the rotation recess 30. The flanges 78 perform the function of maintaining the posture of the holder 70 also by coming into contact with the inner surface 32a, opposed to the bottom surface 30a of the rotation recess 30, of the lock groove 32.

As shown in FIG. 14, each support projection 80 extend in the circumferential direction of the holder 70A in such a manner that its circumferential length W1 is longer than the circumferential length W2 of each flange 78. The support projections 80 project rearward slightly from the rear edge of the holder 70A, and each support projection 80 has a play-preventive flange 80a which projects outward in a radial direction from the outer circumferential surface of a tip portion of the support projection 80. With this structure, the area of contact, to the bottom surface 30a of the rotation recess 30 (of the sensor housing 21A), of each support projection 80 can be made larger than that of each rib 79 described above. And the area of contact, to the bottom surface 30a of the rotation recess 30, of each support projection 80 can be made approximately equal to that of each flange 78. As a result, the support projections 80 are made equivalent in sliding wear resistance to the flanges 78 and hence the liquid level detecting device according to the other embodiment having the holder 70A is made even more reliable in terms of product durability.

Figure 15A:
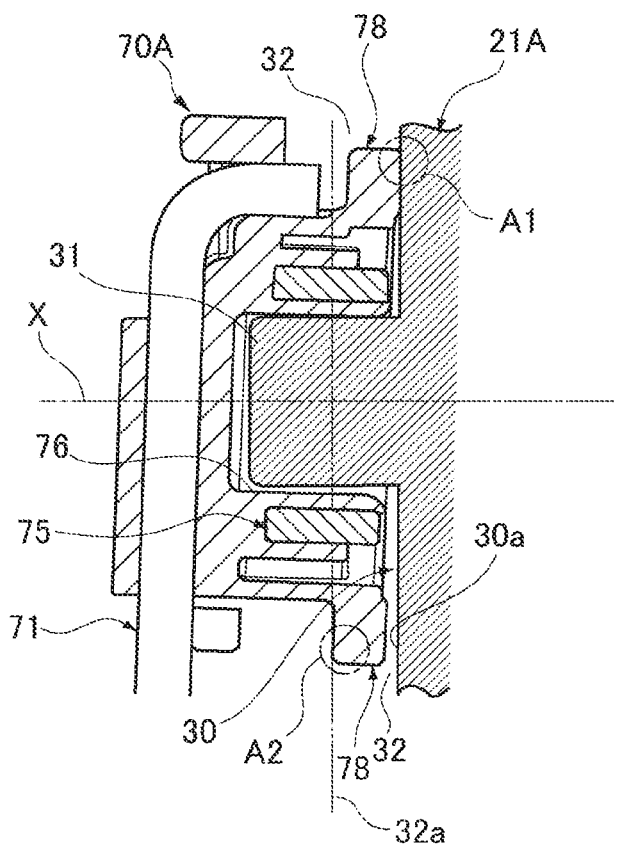
FIGS. 15A and 15B illustrate how the flanges and the support projections shown in FIG. 14 control the posture of the holder.
Figure 15B:
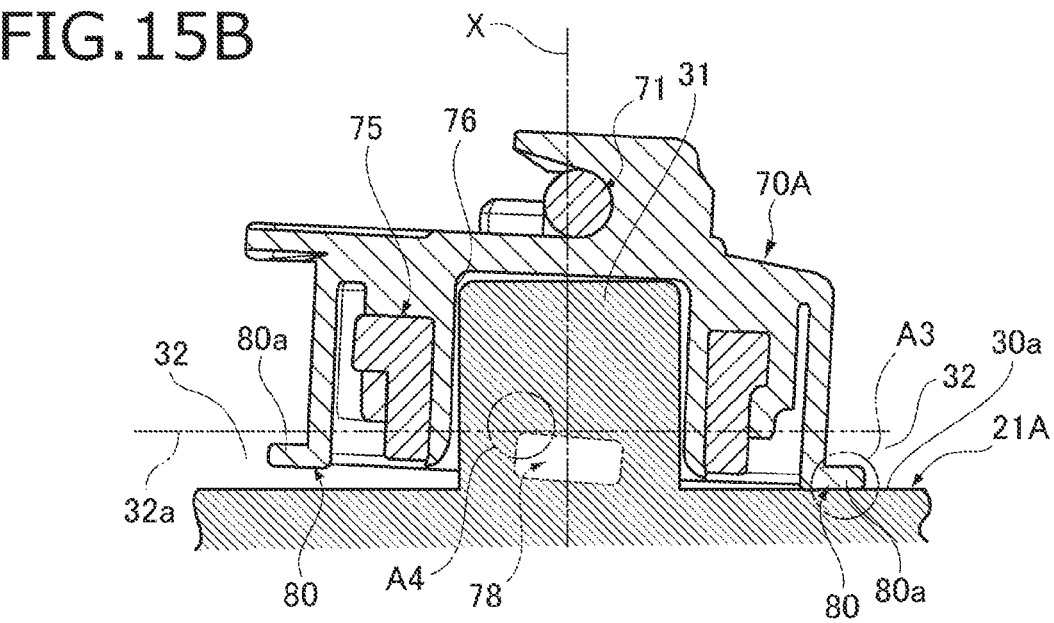

Next, the function of maintaining the posture of the holder 70A which is performed by the flanges 78 and the support projections 80 will be described. FIGS. 15A and 15B illustrate how the flanges 78 and the support projections 80 control the posture of the holder 70A. FIG. 15A is a vertical sectional view and FIG. 15B is a horizontal sectional view.

As shown in FIG. 15A, if a force that crosses the rotation axis X of the holder 70A in the vertical plane acts on the holder 70A in a state that the flanges 78 are located at the top and bottom positions, one flange 78 comes into contact with the bottom surface 30a of the rotation recess 30 (at a position indicated by symbol A1 in FIG. 15A) and the other flange 78 comes into contact with the inner surface 32a of the lock groove 32 (at a position indicated by symbol A2 in FIG. 15A). In this manner, inclination of the holder 70A in the vertical plane is suppressed.

As shown in FIG. 15B, if a force that crosses the rotation axis X of the holder 70A in the horizontal plane acts on the holder 70A in a state that the flanges 78 are located at the top and bottom positions, the play-preventive flange 80a of one support projection 80 comes into contact with the bottom surface 30a of the rotation recess 30 (at a position indicated by symbol A3 in FIG. 15B) and edges of the flanges 78 (located at the top and bottom positions) come into contact with the inner surface 32a of the lock groove 32 (at positions indicated by symbol A4 in FIG. 15B). In this manner, inclination of the holder 70A in the horizontal plane is suppressed.

As described above, in the liquid level detecting device according to the other embodiment, as in the above liquid level detecting device 10 having the holder 70, since the pair of flanges 78 for preventing the holder 70A from coming off the rotation recess 30 of the sensor housing 21A are disposed at the opposite positions, the rotation angle range of the holder 70A can be increased. Furthermore, in the liquid level detecting device according to the other embodiment, the posture of the holder 70A can be stabilized by the flanges 78 and the support projections 80, whereby the liquid level detection accuracy can be increased.

Features of the liquid level detecting device 10 according to the embodiment of the invention will be summarized concisely below in the forms of items [1] to [3]:

[1] A liquid level detecting device (10) including:
a sensor housing (21, 21A) having a circular rotation recess (30);
a circular holder (70, 70A) which is fitted in the rotation recess (30) and thereby held rotatably;
a float arm (71) which is fixed to the holder (70, 70A);
a float (72) which is attached to a tip portion of the float arm (71) and varies in position following a liquid surface of liquid stored in a tank;
a magnet (75) having a circular-ring shape and which is provided in the holder (70, 70A); and
a Hall element (25) which is provided in the sensor housing (21, 21A) and detects a displacement of the magnet (75), wherein the sensor housing (21, 21A) has a lock groove (32) which is formed over an inner circumference portion of the rotation recess (30) in a circumference direction of the circular rotation recess (30) and a pair of insertion holes (33) which are formed at opposite positions on a circumferential edge of the rotation recess so as to communicate with the lock groove (32);
wherein the holder (70, 70A) has a pair of flanges (78) which project in opposite directions from an outer circumferential surface of the holder (70) and are engaged with the lock groove (32) and prevented from coming off the rotation recess (30) by setting the flanges (78) opposed to the respective insertion holes (33), fitting the flanges (78) into the rotation recess (30), and then rotating the flanges (78); and
wherein the holder (70, 70A) has a pair of support projections (ribs 79, 80) which come into contact with a bottom surface (30a) of the rotation recess (30) and the pair of support projections (ribs 79, 80) are arranged at middle positions between the flanges (78) respectively in a circumferential direction of the holder (70).

[2] The liquid level detecting device (10) according to item [1], wherein the sensor housing (21, 21A) has a shaft portion (31) which projects from the bottom surface (30a) of the rotation recess (30), the shaft portion (31) incorporating the Hall element (25); and wherein an axial recess (76) configured to receive the shaft portion (31) is formed at inside the magnet (75) in the holder (70, 70A).

[3] The liquid level detecting device according to item [1] or [2], wherein the support projections (80) extend in the circumferential direction of the holder (70A), and each of the support projections (80) has a play-preventive flange (80a) that projects in a radial direction of the holder (70) from an outer circumferential surface of a tip portion of the support projection (80).

What is claimed is:

1. A device comprising:
a sensor housing having a circular rotation recess;
a circular holder which is fitted in the rotation recess and is held rotatably by the sensor housing;
a float arm which is fixed to the holder;
a float which is attached to a tip portion of the float arm and varies in position following a liquid surface of liquid stored in a tank;
a magnet having a circular-ring shape and which is provided in the holder; and
a Hall element which is provided in the sensor housing and detects a displacement of the magnet,
wherein the sensor housing has a lock groove which is formed over an inner circumference portion of the rotation recess in a circumference direction of the circular rotation recess and a pair of insertion holes which are formed at opposite positions on a circumferential edge of the rotation recess so as to communicate with the lock groove;
wherein the holder has a pair of flanges which project in opposite directions from an outer circumferential surface of the holder and are engaged with the lock groove and prevented from coming off the rotation recess by setting the flanges opposed to the respective insertion holes, fitting the flanges into the rotation recess, and then rotating the flanges; and
wherein the holder has a pair of support projections which come into contact with a bottom surface of the rotation recess and the pair of support projections are arranged at middle positions between the flanges respectively in a circumferential direction of the holder.

2. The device according to claim 1, wherein the sensor housing has a shaft portion which projects from the bottom surface of the rotation recess, the shaft portion incorporating the Hall element; and
wherein an axial recess configured to receive the shaft portion is formed at inside the magnet in the holder.

3. The device according to claim 1, wherein the support projections extend in the circumferential direction of the holder, and each of the support projections has a play-preventive flange that projects in a radial direction of the holder from an outer circumferential surface of a tip portion of the support projection.

4. The device according to claim 1,
wherein the magnet is arranged between the pair of flanges, wherein each of the flanges is extended away from the magnet in ones of the opposite directions which are extended from the magnet to at least the flanges respectively, wherein the pair of support projections project in second opposite directions from the outer circumferential surface of the holder, wherein the magnet is arranged between the pair of support projections, wherein each of the support projections is extended away from the magnet in ones of the second opposite directions which are extended from the magnet to at least the support projections respectively.

\* \* \* \* \*